(12) United States Patent
Murata

(10) Patent No.: US 10,705,775 B2
(45) Date of Patent: Jul. 7, 2020

(54) COMMUNICATION APPARATUS HAVING REMOTE CONTROL CAPABILITY, CONTROL METHOD, AND NON-TRANSITORY COMPUTER-READABLE MEDIUM

(71) Applicant: CANON KABUSHIKI KAISHA, Tokyo (JP)

(72) Inventor: Takemasa Murata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/011,777

(22) Filed: Jun. 19, 2018

(65) Prior Publication Data

US 2019/0004750 A1 Jan. 3, 2019

(30) Foreign Application Priority Data

Jun. 28, 2017 (JP) .................................. 2017-126523

(51) Int. Cl.
*G06F 3/12* (2006.01)
*H04N 1/00* (2006.01)
(Continued)

(52) U.S. Cl.
CPC ....... *G06F 3/1236* (2013.01); *G03G 15/5075* (2013.01); *G06F 3/1203* (2013.01); *G06F 3/1285* (2013.01); *G06F 3/1292* (2013.01); *H04L 67/12* (2013.01); *H04N 1/00344* (2013.01); *H04N 1/00408* (2013.01); *G06K 15/007* (2013.01)

(58) Field of Classification Search
None
See application file for complete search history.

(56) References Cited

U.S. PATENT DOCUMENTS 10,075,615 B2 * 9/2018 Eum .................... H04N 1/4413
10,225,435 B2 3/2019 Hosoda et al.
(Continued)

FOREIGN PATENT DOCUMENTS

JP 2015-158805 A 9/2015
JP 2015-228111 A 12/2015
(Continued)

OTHER PUBLICATIONS

Japanese Office Action dated Jun. 24, 2019, in related Japanese Patent Application No. 2017-126523.

*Primary Examiner* — Miya J Williams
(74) *Attorney, Agent, or Firm* — Venable LLP

(57) ABSTRACT

A communication apparatus transmits, to another apparatus via a first wireless communication, remote control information which is related to remote control of the communication apparatus, and transmits, when information which is received from the other apparatus via the second wireless communication corresponds to the remote control information, information related to a screen of a remote control permitted state to the other apparatus via second wireless communication. When the information which is received from the other apparatus via the second wireless communication does not correspond to the remote control information, information related to a login screen for the remote control is transmitted.

21 Claims, 7 Drawing Sheets

(51) Int. Cl.
*G03G 15/00* (2006.01)
*H04L 29/08* (2006.01)
*G06K 15/00* (2006.01)

(56) References Cited

U.S. PATENT DOCUMENTS

| | | | |
|---|---|---|---|
| 10,278,045 B2 | 4/2019 | Suzuki | |
| 2008/0288879 A1* | 11/2008 | Tomita | G03G 15/5075 715/762 |
| 2009/0080023 A1* | 3/2009 | Watabe | H04L 67/08 358/1.15 |
| 2011/0063215 A1* | 3/2011 | Mishima | G06F 3/0482 345/158 |
| 2011/0317224 A1* | 12/2011 | Nagai | 1/204 |
| 2012/0069380 A1* | 3/2012 | Sugimoto | G06F 3/1205 358/1.14 |
| 2012/0075658 A1* | 3/2012 | Yasui | G06F 3/1207 358/1.14 |
| 2013/0222847 A1* | 8/2013 | Okuma | G06K 15/002 358/1.15 |
| 2016/0065759 A1* | 3/2016 | Sakaguchi | H04N 1/00307 358/1.15 |
| 2016/0105577 A1* | 4/2016 | Koike | H04N 1/00511 358/1.15 |
| 2016/0337553 A1 | 11/2016 | Sato | |
| 2016/0373594 A1* | 12/2016 | Kurihara | H04N 1/00103 |
| 2017/0078512 A1* | 3/2017 | Mochizuki | H04L 41/5074 |
| 2017/0353922 A1* | 12/2017 | Shirakawa | H04W 52/0209 |
| 2018/0160002 A1* | 6/2018 | Nishiyama | H04W 76/14 |
| 2018/0183596 A1* | 6/2018 | Deshpande | H04L 63/0442 |
| 2018/0192272 A1 | 7/2018 | Suzuki | |
| 2018/0359638 A1* | 12/2018 | Konji | H04M 1/00 |
| 2019/0116287 A1 | 4/2019 | Hosoda et al. | |

FOREIGN PATENT DOCUMENTS

| | | |
|---|---|---|
| JP | 2016-066217 A | 4/2016 |
| JP | 2016-126732 A | 7/2016 |
| JP | 2017-112558 A | 6/2017 |

* cited by examiner

COMMUNICATION APPARATUS HAVING REMOTE CONTROL CAPABILITY, CONTROL METHOD, AND NON-TRANSITORY COMPUTER-READABLE MEDIUM

BACKGROUND OF THE INVENTION

Field of the Invention

The present invention relates to security control in remote control.

Description of the Related Art

There is used a remote control technique of controlling, from another apparatus via a network, an apparatus such as a printer which is capable of performing communication. For example, Japanese Patent Laid-Open No. 2015-158805 discloses that a remote UI is used for remotely controlling a function of an MFP (Multi-Function Peripheral) which serves as a printing apparatus.

Due to an increase in opportunities for various types of apparatuses to be communicable with each other, further improvement of operability of the remote UI at the time of its use is desired.

SUMMARY OF THE INVENTION

The present invention achieves both a security assurance for each user at the time of remote control and an improvement in operability for each user.

According to one aspect of the present invention, there is provided a communication apparatus comprising: a first wireless communication unit; a second wireless communication unit different from the first wireless communication unit; and a control unit configured to perform control to transmit remote control information, which is related to remote control of the communication apparatus from another apparatus, to the other apparatus by the first wireless communication unit, and to transmit, when information which is received from the other apparatus by the second wireless communication unit corresponds to the remote control information, information related to a screen of a remote control permitted state to the other apparatus by the second wireless communication unit, wherein the control unit transmits, when the information which is received from the other apparatus by the second wireless communication unit does not correspond to the remote control information, information different from the information related to the screen of the remote control permitted state.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangement of Communication System)

Figure 1:
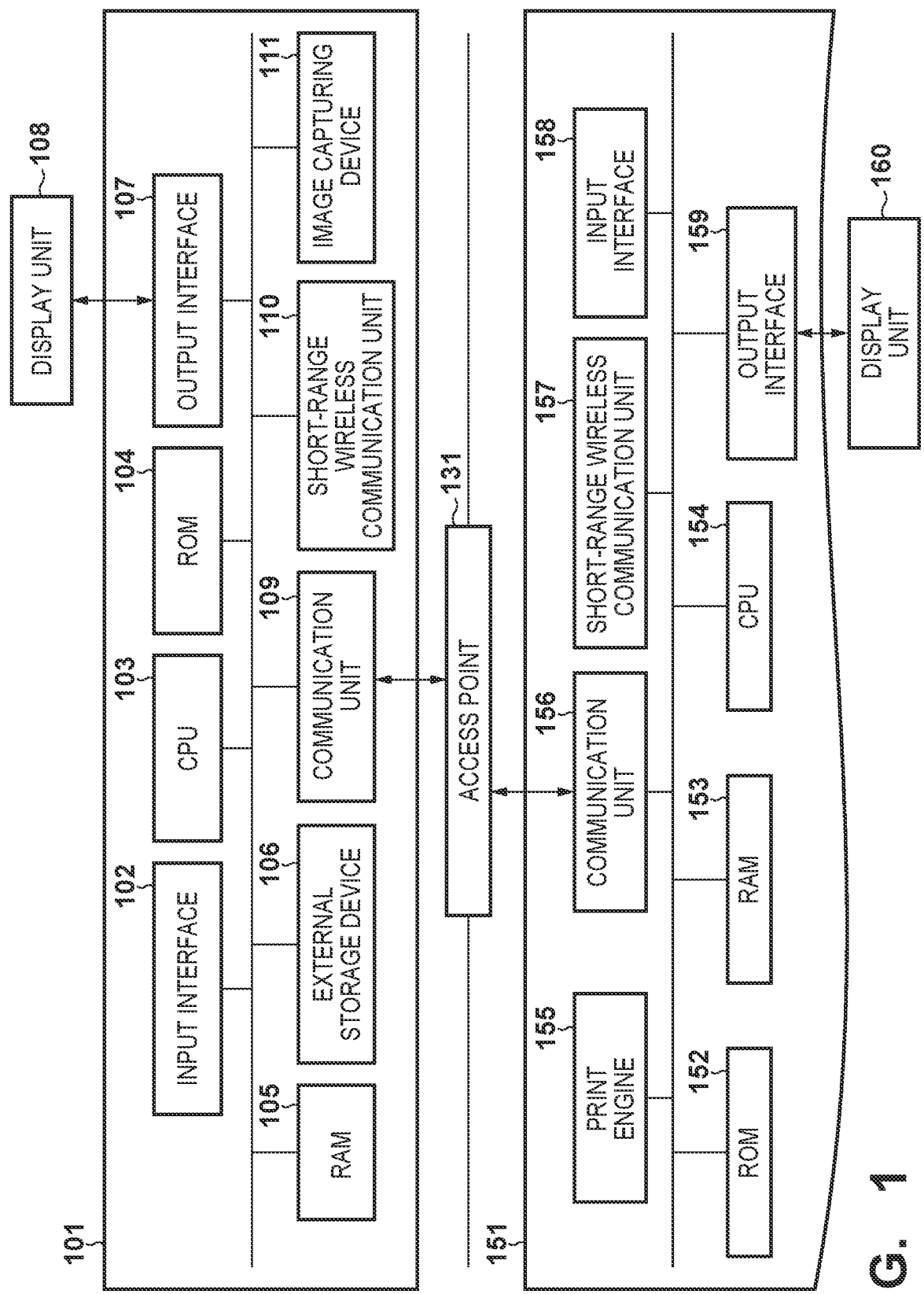
FIG. 1 is a block diagram showing an example of a communication system.

FIG. 1 shows an example of the arrangement of a communication system and apparatuses in the system according to this embodiment. The communication system is formed by, for example, an information processing apparatus 101, an access point 131, and a communication apparatus 151. The information processing apparatus 101 is, for example, an arbitrary information processing apparatus such as a smartphone, a mobile terminal, a notebook PC (Personal Computer), a tablet terminal, a PDA (Personal Digital Assistant), a digital camera, or the like. Assume that the information processing apparatus 101 is a smartphone hereinafter. The communication apparatus 151 is, for example, a printer, but can be an arbitrary electronic device capable of performing wireless communication with the information processing apparatus 101. For example, the communication apparatus 151 may be a copying apparatus, a facsimile apparatus, a mobile terminal, a smartphone, a notebook PC, a tablet terminal, a PDA, a digital camera, a music playback device, or a television. The communication apparatus 151 may be a multi-function peripheral that has a plurality of functions such as a copy function, a FAX function, a print function, and the like. Assume that the communication apparatus 151 is a printer such as an inkjet printer, a full-color laser beam printer, a monochrome printer, or the like hereinafter.

The information processing apparatus 101 includes, in one example, an input interface 102, a CPU 103, a ROM 104, a RAM 105, an external storage device 106, an output interface 107, a communication unit 109, a short-range wireless communication unit 110, and an image capturing device 111. Note that these blocks are connected to each other by using, for example, an internal bus. CPU, ROM, and RAM are acronyms of Central Processing Unit, Read Only Memory, and Random Access Memory, respectively. Although it is shown as if a display unit 108 (external display device) is present outside the information processing apparatus 101 in FIG. 1, the display unit 108 may be a display incorporated in the information processing apparatus 101. Note that the arrangement of these blocks is merely an example, and the information processing apparatus 101 may include blocks other than those shown in FIG. 1. The plurality of blocks shown in FIG. 1 may be integrated into a single block or a single block may be divided into two or more blocks. That is, the information processing apparatus 101 can have an arbitrary arrangement within the range in which processing, which is to be described later, can be executed.

The CPU 103 is a system control unit and controls the overall information processing apparatus 101. The ROM 104 stores permanent data such as control programs and data tables to be executed by the CPU 103, an embedded OS (Operating System) program, and the like. In this embodiment, each control program stored in the ROM 104 is used to perform, under the management of the embedded OS stored in the ROM 104, software execution control such as scheduling, task switching, interrupt processing, and the like. The RAM 105 is formed from, for example, an SRAM (Static RAM) requiring a backup power supply. Note that since data is held by a primary battery for data backup (not shown), the RAM 105 can store data such as program control variables and the like in a non-volatile manner. A memory area that stores the setting information of the information processing apparatus 101, the management data of the information processing apparatus 101, and the like is also arranged in the RAM 105. The RAM 105 is also used as the main memory and the work memory of the CPU 103. The external storage device 106 stores an application that provides a print execution function. The external storage device 106 stores various kinds of programs such as a print job generation program for generating a print job interpretable by the communication apparatus 151, an information transmission/reception control program for exchanging information with the communication apparatus 151 which is connected via the communication unit 109, and the like. The various kinds of information to be used by these programs and image data obtained from other information processing apparatuses or the Internet via the communication unit can be saved in the external storage device 106.

The input interface 102 is an interface for accepting data inputs and operation instructions from a user and is formed from a physical keyboard, buttons, and the like. The output interface 107 is an interface that performs control to cause the display unit 108 to display data and perform notification of the state of the information processing apparatus 101. The display unit 108 is formed from an LED (light emitting diode), LCD (liquid crystal display), and the like, displays data, and performs notification processing of the state of the information processing apparatus 101. Note that the input interface 102 for accepting an operation from the user and the output interface 107 (and the display unit 108), to be described later, for screen output may be implemented by a single device such as a touch panel. For example, a software keyboard including keys such as numerical value input keys, a mode setting key, an enter key, a cancel key, and a power key may be displayed on the display unit 108 so that an input from the user can be accepted via the display unit 108. Note that the output interface 107 may perform control to cause an output unit (not shown) to present information by sound output and vibration output.

The communication unit 109 is formed from a circuit and an antenna for performing communication in accordance with a predetermined wireless communication method, connects to another apparatus such as the communication apparatus 151 which can perform communication in accordance with the same wireless communication method, and executes data communication. For example, the communication unit 109 has a function as a wireless LAN terminal, and in a case in which a communication unit 156 of the communication apparatus 151 functions as an access point, the communication unit can wirelessly connect to the access point. The establishment of a connection between the communication unit 109 and the communication unit 156 allows the information processing apparatus 101 and the communication apparatus 151 to communicate with each other. Note that when the communication unit 109 is to operate as an access point, it is possible to establish a connection by causing the communication apparatus 151 to operate as a terminal. Additionally, execution of inter-terminal communication is also possible by causing both the information processing apparatus 101 and the communication apparatus 151 to operate as terminals. Note that the communication unit 109 and the communication unit 156 may each include hardware to serve as an access point or a terminal and be formed to permanently execute each function or may have a software capability to dynamically switch between these functions. Also, both the communication unit 109 and the communication unit 156 can operate as terminals and connect to each other via, for example, the access point 131. Note that a method of connecting the information processing apparatus 101 and the communication apparatus 151 without intervention of another apparatus such as the access point 131 will be called a direct connection method, and a method of connecting the information processing apparatus and the communication apparatus via a base station apparatus such as the access point 131 will be called an infrastructure connection method hereinafter. Note that, for example, a device such as a wireless LAN router can be used as the access point 131. The communication unit 109 and the communication unit 156 may each have the capability to operate in accordance with a wireless communication method by a wireless LAN in compliance with the IEEE802.11 standard series or have the capability to operate in accordance with another wireless communication method. For example, the communication unit 109 and the communication unit 156 may each have the capability to operate in compliance with, for example, a standard such as Bluetooth® (version 3.0 or earlier in one example).

The short-range wireless communication unit 110 includes a circuit and an antenna for executing data communication by wirelessly connecting the information processing apparatus 101 to another apparatus such as the communication apparatus 151 which is present within a predetermined short range. Note that the short-range wireless communication unit 110 performs communication by a wireless communication method different from that of the communication unit 109. The short-range wireless communication unit 110 can connect to a short-range wireless communication unit 157 of the communication apparatus 151 that operates in accordance with the same wireless communication method. Assume that in this embodiment, the short-range wireless communication unit 110 and the short-range wireless communication unit 157 operate in compliance with the Bluetooth Low Energy (BLE) standard. In this embodiment, the communication speed of the wireless communication using the communication unit 109 and the communication unit 156 is higher than that of the wireless communication using the short-range wireless communication unit 110 and the short-range wireless communication unit 157. Furthermore, in this embodiment, the communication distance of the wireless communication using the communication unit 109 and the communication unit 156 is longer than that of the wireless communication using the short-range wireless communication unit 110 and the short-range wireless communication unit 157.

The image capturing device 111 is a device that converts an image captured by an image sensor into digital data. The digital data is stored once in the RAM 105, subsequently converted into a predetermined image format based on a program executed by the CPU 103, and saved as image data in the external storage device 106.

The communication apparatus 151 includes, in one example, a ROM 152, a RAM 153, a CPU 154, a print engine 155, the communication unit 156, the short-range wireless communication unit 157, an input interface 158, and an output interface 159. Note that these blocks are connected to each other by using, for example, an internal bus. Although it is shown as if a display unit 160 (external display device) is present outside the communication apparatus 151 in FIG. 1, the display unit 160 may be a display incorporated in the communication apparatus 151. Note that the arrangement of these blocks is merely an example, and the communication apparatus 151 may include blocks other than those shown in FIG. 1. The plurality of blocks shown in FIG. 1 may be integrated into a single block or a single block may be divided into two or more blocks. That is, the communication apparatus 151 can have an arbitrary arrangement within the range in which the processing, which is to be described later, can be executed.

The CPU 154 is a system control unit and controls the overall communication apparatus 151. The RAM 153 is formed from, for example, a DRAM (Dynamic RAM) requiring a backup power supply, in the same manner as the RAM 105. The RAM 153 is also used as the main memory and the work memory of the CPU 154, can be used as a reception buffer for temporarily saving a print job received from the information processing apparatus 101, and can be used when saving various kinds of information. The ROM 152 stores permanent data such as control programs and data tables which are to be executed by the CPU 154, an OS program, and the like. In this embodiment, each control program stored in the ROM 152 is used to perform, under the management of the embedded OS stored in the ROM 152, software execution control such as scheduling, task switching, interrupt processing, and the like. The ROM 152 can also be provided with a memory area, such as the setting information of the communication apparatus 151, the management data of the communication apparatus 151, and the like, that stores data required to be held even when power supply is not performed.

The communication unit 156 has the same functions as the above-described communication unit 109 and can communicate with the communication unit 109 by direct communication or indirect communication via the access point 131. The short-range wireless communication unit 157 is a device that can perform short-range wireless communication with the short-range wireless communication unit 110 by using the same wireless communication method (a communication method in compliance with the BLE standard in this embodiment) as that of the short-range wireless communication unit 110 of the information processing apparatus 101.

The print engine 155 performs, based on information saved in the RAM 153 or a print job received from the information processing apparatus 101, image formation on a print medium such as paper by using a print agent such as ink and outputs a print result. At this time, since a print job transmitted from the information processing apparatus 101 has a large transmission data amount and requires high-speed communication, it can be received via the communication unit 156 which can communicate at a higher speed than the short-range wireless communication unit 157.

The input interface 158 is an interface for accepting data inputs and operation instructions from the user and is formed from a physical keyboard, buttons, a touch panel, and the like. The output interface 159 is an interface to perform control to cause the display unit 160 to display data and perform notification of the state of the communication apparatus 151. The display unit 160 is formed from an LED (light emitting diode), LCD (liquid crystal display), and the like, displays data, and notifies the user of the state of the communication apparatus 151. Note that the input interface 158 for accepting an operation from the user and the output interface 159 (and the display unit 160), to be described later, for screen output may be implemented by a single device such as a touch panel. For example, a software keyboard including keys such as numerical value input keys, a mode setting key, an enter key, a cancel key, and a power key can be displayed on the display unit 160 so that an input from the user can be accepted via the display unit 160. Note that the output interface 159 may perform control to cause an output unit (not shown) to present information by sound output and vibration output.

Note that a memory such as an external HDD or an SD card may be mounted to the communication apparatus 151 as an optional device, and the information saved in the communication apparatus 151 may be saved in this memory. Here, although an example of processing sharing between the information processing apparatus 101 and the communication apparatus 151 has been described above, the form of processing sharing is not particularly limited to this, and another form of processing sharing may be used.

Figure 2:
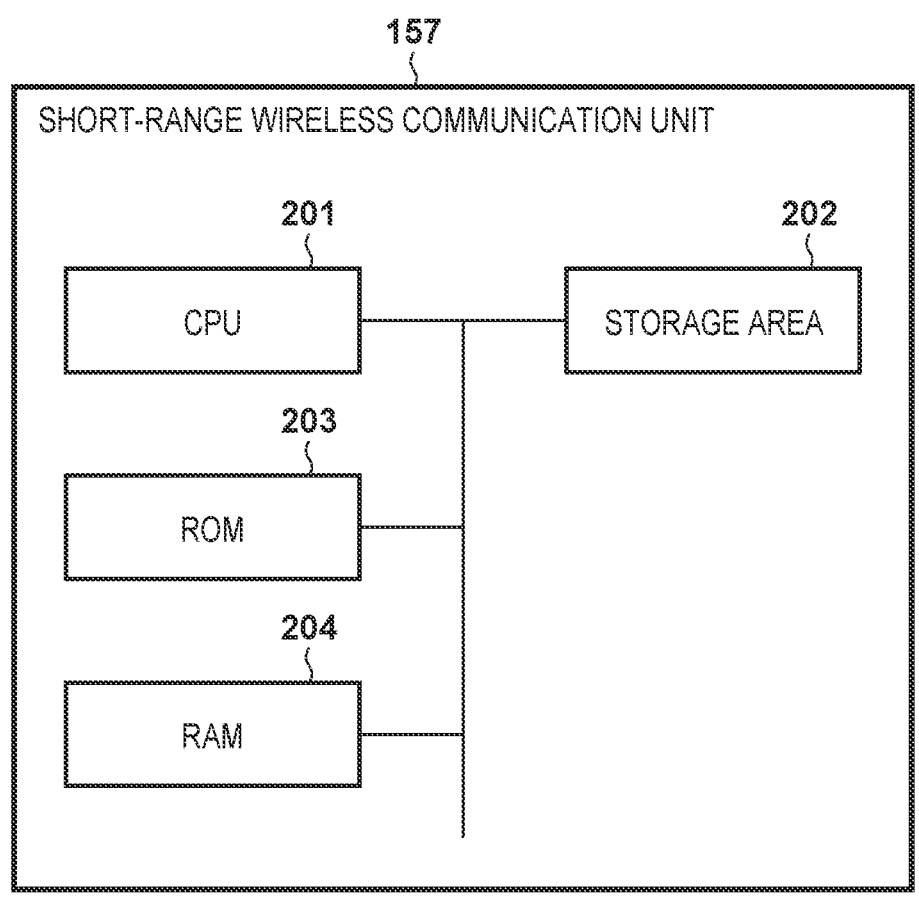
FIG. 2 is a block diagram showing an example of a short-range wireless communication unit.

Details of the short-range wireless communication unit 157 will be described with reference to FIG. 2. The short-range wireless communication unit 157 includes an arrangement for performing short-range wireless communication with an apparatus such as the information processing apparatus 101. In this embodiment, the short-range wireless communication unit 157 communicates by a wireless communication method in compliance with the BLE standard as described above. Note that the short-range wireless communication unit 157 and the CPU 154 can communicate with each other via a bus interface such as an I2C (Inter-Integrated Circuit), and the CPU 154 can, for example, access the storage area inside the short-range wireless communication unit 157. For example, a CPU 201, a storage area 202, a ROM 203, and a RAM 204 are included inside the short-range wireless communication unit 157. The CPU 201 controls the overall short-range wireless communication unit 157. The ROM 203 stores permanent data such as control programs and data tables which are to be executed by the CPU 201, an OS program, and the like. The RAM 204 is formed from, for example, a DRAM requiring a backup power supply and has the capability to store important data such as program control variables in a non-volatile manner. The RAM 204 can also be used as the main memory and the work memory of the CPU 201. The storage area 202 is an area that can store information accessible from the CPU 154 or the information processing apparatus 101 via the short-range wireless communication unit 110. Note that the storage area 202 is formed from an arbitrary device capable of storing information, and may be formed, for example, as a part of the RAM 204 or be formed, for example, by a nonvolatile memory separate from the ROM 203 and the RAM 204.

Figure 3:
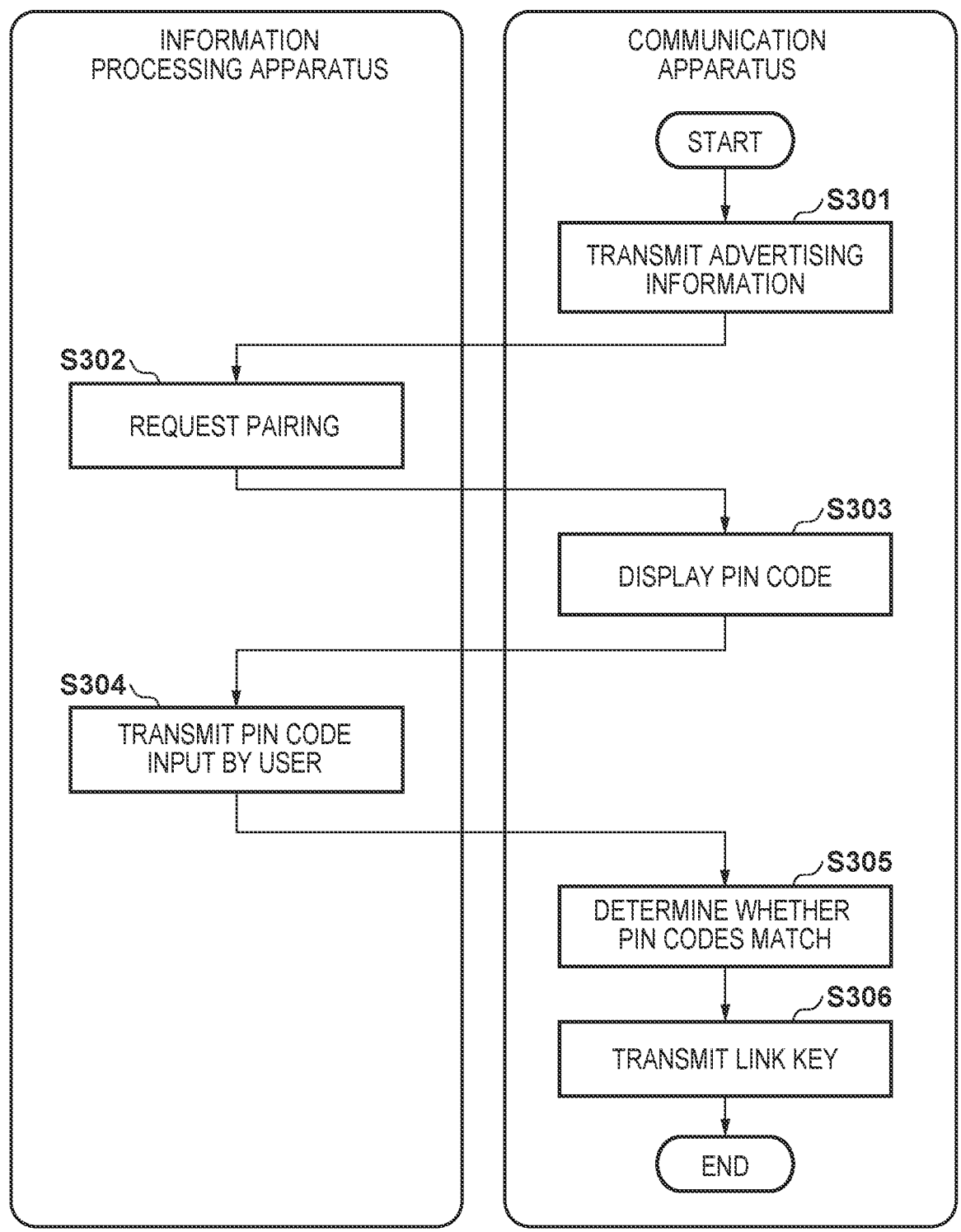
FIG. 3 is a flowchart showing the outline of a BLE communication procedure.

The outline of advertising information transmission, pairing processing, and GATT (Generic Attribute Profile) communication in compliance with the BLE standard will be described here with reference to FIG. 3. Note that in FIG. 3 and FIGS. 5 to 7, processing on the side of the information processing apparatus is implemented by the CPU 103 reading out a program from a memory and executing the program. The processing on the side of the communication apparatus is implemented by the CPU 154 reading out a program from a memory and executing the program.

In this processing, the short-range wireless communication unit 157 of the communication apparatus 151 transmits (step S301) advertising information by periodically broadcasting the information to its surroundings. The advertising information is a signal that is formed from a header and a payload and includes basic header information such as identification information and the like for identifying the apparatus which is transmitting the advertising information. The information processing apparatus 101 can recognize the presence of the communication apparatus 151 in its surroundings by receiving this advertising information. Upon receiving advertising information which includes the specific apparatus information, the information processing apparatus 101 transmits (step S302) a pairing request to the communication apparatus 151 by executing communication in accordance with a security manager protocol (SMP) defined by the BLE standard. Note that the communication between the apparatuses executed until the end of the pairing can be performed by SMP. Upon receiving the pairing request, the communication apparatus 151 displays (step S303) a PIN code on the display unit 160 of the self-apparatus. On the other hand, the information processing apparatus 101 displays a PIN code input screen and changes to a standby state for the user to input the PIN code. When the PIN code that is displayed on the communication apparatus 151 is input to the information processing apparatus 101 by the user, the information processing apparatus 101 transmits (step S304) the PIN code, which has been input by the user, to the communication apparatus 151. Upon receiving a signal that includes the PIN code and is transmitted from the information processing apparatus 101, the communication apparatus 151 determines (step S305) whether the PIN code included in this signal and the PIN code displayed on the PIN code display screen match. When it is determined that these PIN codes match, the communication apparatus 151 permits (step S306) pairing with the information processing apparatus 101. More specifically, the communication apparatus 151 transmits, to the information processing apparatus 101 by using SMP, a link key generated by a predetermined method based on the PIN code. In this manner, the link key is saved in each of the storage area (the ROM 104 or the like) in the information processing apparatus 101 and the storage area (the ROM 152 or the like) in the communication apparatus 151. As a result, the pairing is completed, and the subsequent execution of the GATT communication between the information processing apparatus 101 and communication apparatus 151 is permitted. Note that even in a state in which the pairing is not performed, it may be set so that GATT communication can be performed for some pieces of information. However, in this embodiment, in a state in which the pairing between the information processing apparatus 101 and the communication apparatus 151 has not been executed, assume that the communication apparatus 151 will not permit the read/write of information by GATT communication. Note that although the method of inputting a PIN code, which is displayed on the communication apparatus 151, to the information processing apparatus 101 has been described as an example of the pairing processing according to this embodiment, another method may be employed. For example, the communication apparatus 151 can change to a pairing processing standby state when the user presses a pairing button on the communication apparatus 151. The information processing apparatus 101 can recognize the state of the communication apparatus 151 by using the GATT communication before the pairing processing. In response to recognizing that the state of the communication apparatus 151 has changed to the pairing processing standby state, the information processing apparatus 101 can transmit a PIN code that is held in advance to the communication apparatus 151. The pairing processing may be executed by the processing as describe above.

(Examples of Screen Display)

Figure 4:
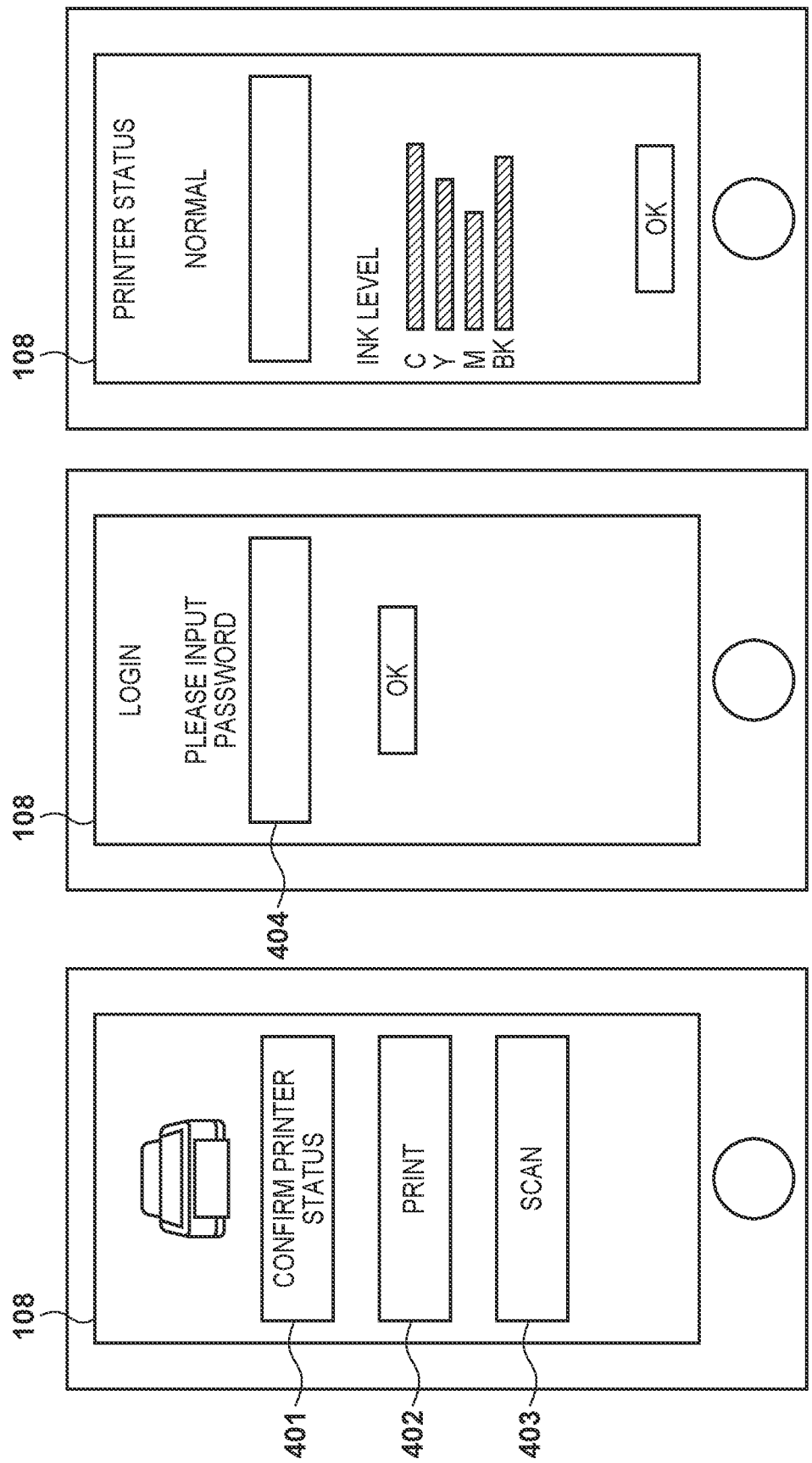
FIGS. 4A to 4C are views each showing an example of a screen which is to be displayed on an information processing apparatus.

FIGS. 4A to 4C are views showing the examples of screens displayed on the display unit 108 of the information processing apparatus 101 when a remote user interface (remote UI) of the communication apparatus 151 is to be displayed. The remote UI in this case is a function that displays the operation status and the operation menu of the communication apparatus 151 by displaying HTML data obtained from the communication apparatus 151 by using a Web browser of the information processing apparatus 101. However, the present invention is not limited to this, and the remote UI can be an arbitrary interface that allows the information processing apparatus 101 to remotely control the communication apparatus 151 or display the information of the communication apparatus 151. For example, a screen such as that shown in FIG. 4A is displayed on the display unit 108 by a print application activated on the information processing apparatus 101. When the user presses a button 401 for confirming the state of the communication apparatus 151, the Web browser is activated, and a screen which shows the state of the printer and the remaining ink amount such as that shown in FIG. 4C is displayed. Additionally, when a printing start button 402 or a scan button 403 is pressed in the print application, a printing start command or a scan start command is transmitted to the communication apparatus 151 so as to cause the information processing apparatus 101 to execute printing or scanning.

The information processing apparatus 101 can display, first, a login screen such as that shown in FIG. 4B when the display of the remote UI is instructed by, for example, the activation of an application or a predetermined operation being performed on the application screen. A password input field 404 is displayed on the login screen, and the user logs in by inputting a password in the password input field 404. The communication apparatus 151 (the information processing apparatus 101 or another authentication apparatus in some cases) can determine, by using user authentication by the password, whether to permit the information processing apparatus 101 to execute remote control of the communication apparatus 151. That is, the communication apparatus 151 can determine to permit a user who has input the correct password to perform remote control, but determine, on the other hand, not to permit a user who has input the incorrect password to perform remote control. The communication apparatus 151 subsequently transmits, to the information processing apparatus 101 of the user who has been permitted to perform remote control, a signal to cause a subsequent remote UI screen to be displayed. This signal may be information that forms the remote UI screen, or in a case in which the information that forms the remote UI screen is held by an application, a trigger signal to permit the display of this screen. Note that the remote UI screen can be a screen such as that shown in FIG. 4A. Also, it may be set so that if the application is activated, a screen as shown in FIG. 4A is displayed, user authentication is performed via the screen shown in FIG. 4B in response to the pressing of the button 401, and a screen as shown in FIG. 4C is displayed as the remote UI screen indicating a successful authentication result.

As a result, only a valid user can remotely control the communication apparatus 151, and security can be ensured.

(Processing Procedure)

If a password is requested, as shown in FIG. 4B, each time remote control is to be performed, it can impair user convenience. Hence, in this embodiment, as will be shown in the processing examples hereinafter, user convenience is improved by causing the information processing apparatus 101 and the communication apparatus 151 to perform login authentication by using short-range wireless communication.

First Processing Example

Figure 5:
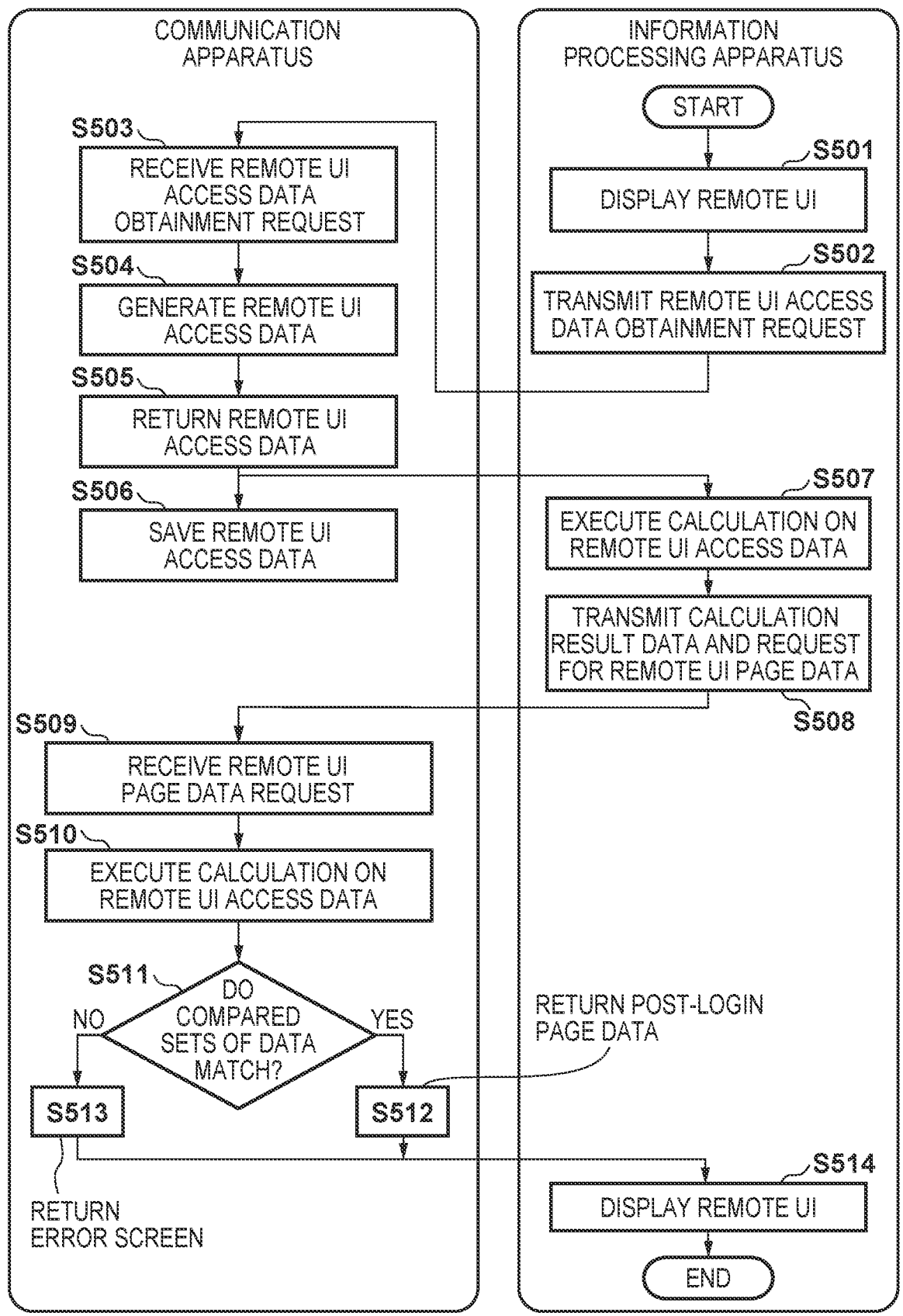
FIG. 5 is a flowchart showing a first example of a processing procedure.
Figure 6:
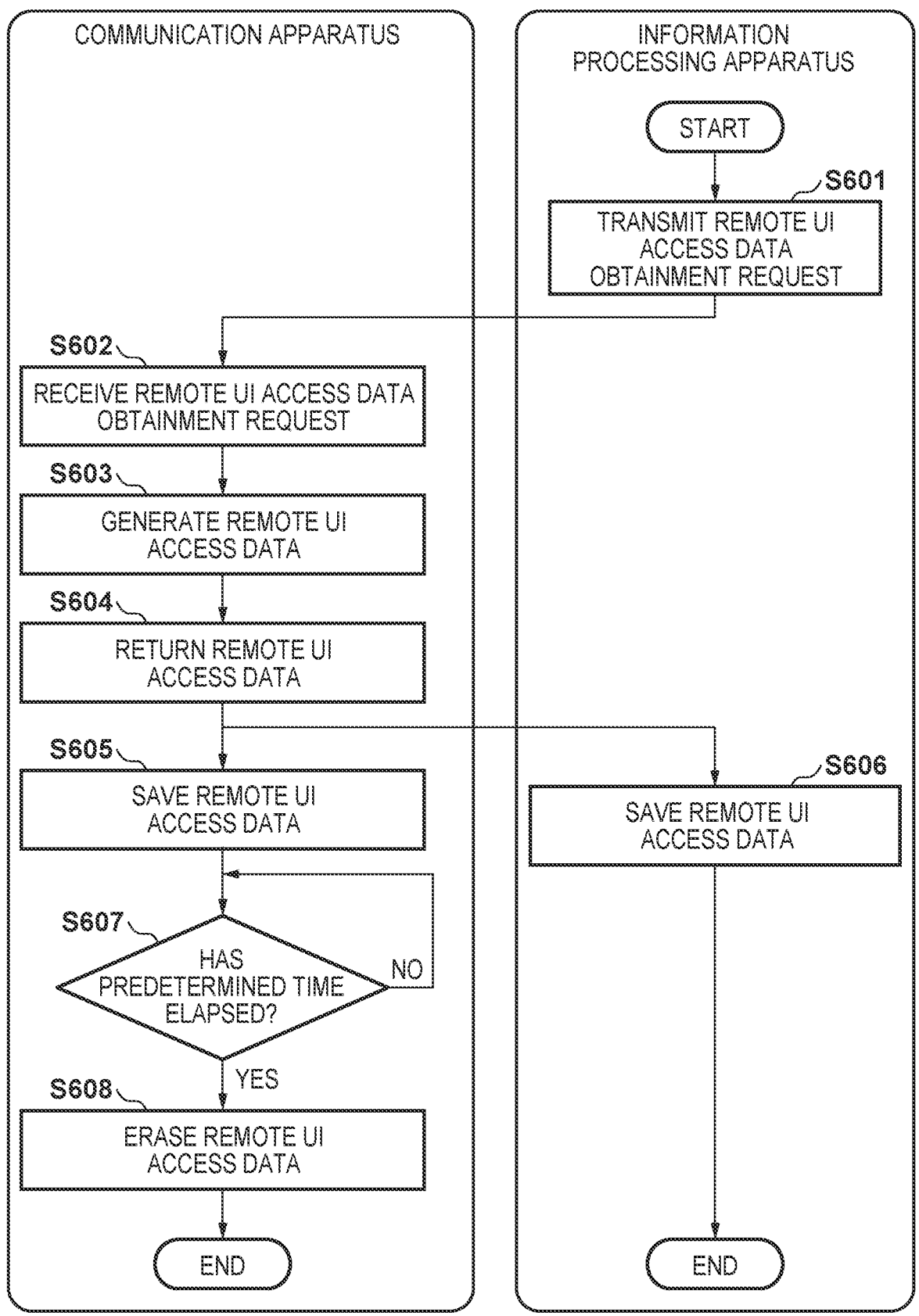
FIG. 6 is a flowchart showing a second example of the processing procedure.
Figure 7:
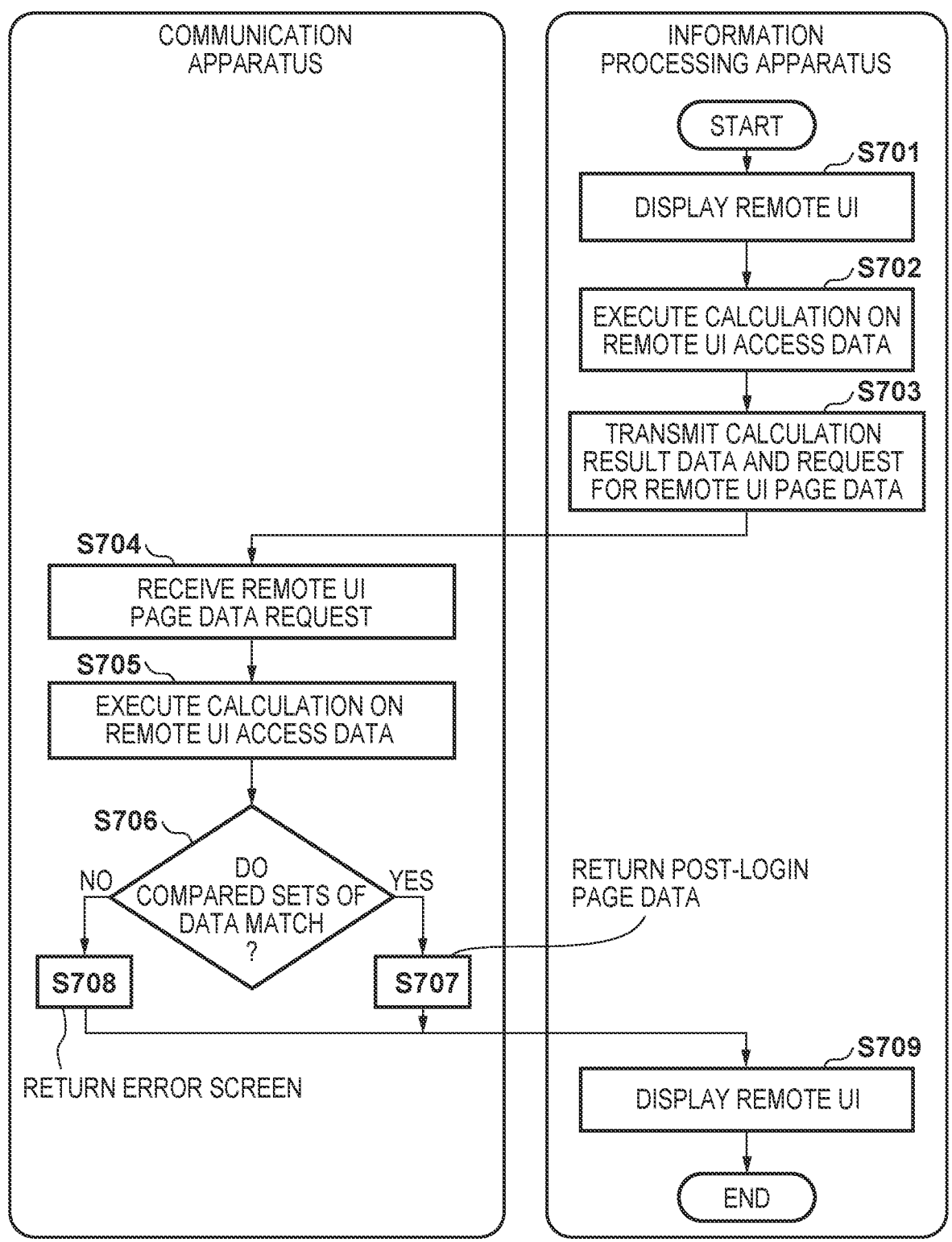
FIG. 7 is a flowchart showing the second example of the processing procedure.

FIG. 5 shows an example of the processing procedure in which login authentication is performed using the short-range wireless communication unit 110 and the short-range wireless communication unit 157 when the information processing apparatus 101 displays the remote UI of the communication apparatus 151. This processing is implemented by the CPUs of the respective apparatuses reading out various kinds of programs stored in their storage areas and executing the programs. Note that in the following example, it is assumed that the screen of FIG. 4A is displayed when an application is activated in the information processing apparatus 101, and the screen of FIG. 4C is displayed subsequently as the remote UI in response to, for example, the user pressing the button 401.

First, the information processing apparatus 101 starts processing to display the remote UI (step S501). That is, when the user presses the button 401 for confirming the state of the communication apparatus 151 in the print application such as that shown in FIG. 4A, the information processing apparatus 101 starts the processing to display the remote UI. When the processing is started, the information processing apparatus 101 transmits, to the short-range wireless communication unit 157 of the communication apparatus 151 via the short-range wireless communication unit 110, a remote UI access data obtainment request (step S502). On the other hand, the communication apparatus 151 receives the remote UI access data obtainment request via the short-range wireless communication unit 157 (step S503). Here, assume that the short-range wireless communication unit 110 and the short-range wireless communication unit 157 perform communication in compliance with the BLE standard, and the request made in step S502 is executed by GATT communication of the BLE standard.

In response to the reception of the remote UI access data obtainment request, the communication apparatus 151 generates the remote UI access data which is to be provided to the information processing apparatus 101 (step S504). The communication apparatus 151 transmits (step S505) the remote UI access data generated in step S504 to the short-range wireless communication unit 110 of the information processing apparatus 101 via the short-range wireless communication unit 157 by, for example, GATT communication of the BLE standard. The communication apparatus 151 also saves in the RAM 153 (step S506) the remote UI access data generated in step S504. The remote UI access data can be, for example, a random character string having a fixed length. However, the present invention is not limited to this, and the remote UI access data may be any kind of data. For example, the communication apparatus 151 can prepare a number of remote UI access data candidates and select one of the candidates as the remote UI access data to be provided to the information processing apparatus 101. That is, the communication apparatus 151 need not generate the remote UI access data each time. However, the communication apparatus 151 can provide, to a request made at least within a predetermined period, remote UI access data which has a different value. This can prevent the remote UI access data from being used repeatedly.

Upon receiving the remote UI access data via the short-range wireless communication unit 110, the information processing apparatus 101 executes a predetermined calculation in accordance with a calculation method predetermined for this data, and saves the calculation result in the RAM 105 (step S507). Assume that the calculation performed here is performed by an irreversible calculation method by which the remote UI access data cannot be regenerated from the calculation result. Subsequently, the information processing apparatus 101 transmits, to the communication apparatus 151 via the communication unit 109, a signal requesting the remote UI display page data (step S508). Information indicating the calculation result (calculation value) obtained from the calculation performed in step S507 is added to this request. For example, if HTTP (Hypertext Transfer Protocol) is to be used, the information processing apparatus 101 makes a remote-UI display page data request by adding the calculation result to the query parameter of the GET method. The communication related to the request in step S508 is performed by the direct connection method or the infrastructure connection method described above.

Upon receiving the remote UI display page data request from the information processing apparatus 101, the communication apparatus 151 saves, in the RAM 153, the above-described calculation result data which was added to the request (step S509). The communication apparatus 151 performs calculation on the remote UI access data saved in step S506 in accordance with the same predetermined calculation method such as that in step S507, and saves the obtained calculation result in the RAM 153 (step S510). The communication apparatus 151 then compares the calculation result data of the step S507 which was saved in step S509 with the calculation result data saved in step S510 (step S511). If it is determined in the comparison that the sets of data match (YES in step S511), the communication apparatus 151 returns the post-login page data to the information processing apparatus 101 (step S512). Here, the page data is, for example, data related to a screen, such as that shown in FIG. 4C, which is a screen that is to be displayed on the information processing apparatus 101 in a remote control permitted state. On the other hand, if it is determined that the sets of data do not match in step S511 (NO in step S511), the communication apparatus 151 returns, to the information processing apparatus 101, the page data of an error screen to perform notification of the login failure (step S513). Note that if it is determined that the sets of data do not match in step S511 (NO in step S511), the communication apparatus 151 may return the login screen page data, such as that shown in FIG. 4B, to the information processing apparatus 101. The communication performed in steps S512 and S513 is also performed by the direct connection method or the infrastructure connection method as described above. Note that the pieces of information transmitted by the communication apparatus 151 in steps S512 and S513 may be the data of the page itself which is to be displayed or the data of an indicator corresponding to the page to be displayed. In the latter case, the information processing apparatus 101 can hold the remote UI page data and the error screen page data as display target candidate images and select a page to be displayed in accordance with the received indicator. The information processing apparatus 101 displays a page corresponding to the returned page data (step S514). Note that after the comparison in step S511, the communication apparatus 151 can discard the remote UI access data saved in the RAM 153 to prevent an unauthorized login.

As described above, when the information processing apparatus 101 is to display the remote UI of the communication apparatus 151 by using short-range wireless communication, predetermined data for remote UI access is transmitted from the communication apparatus 151 to the information processing apparatus 101. The information processing apparatus 101 transmits, to the communication apparatus 151, information indicating a calculation result value based on the received predetermined data by using a second communication function different from the first communication function related to the short-range wireless communication. The communication apparatus 151 compares the received value with a value obtained by performing the same calculation as that performed by the information processing apparatus 101 based on the predetermined data which it had transmitted to the information processing apparatus 101, and the communication apparatus switches the page data that is to be transmitted to the information processing apparatus 101 based on the comparison result. These series of processes can be automatically executed in response to an operation for remote UI display being performed in the information processing apparatus 101 which is present within a range that allows short-range wireless communication with the communication apparatus 151. As a result, it is possible to permit only a predetermined user to perform remote control of the communication apparatus 151 while allowing operations such as password input and the like performed by the user of the information processing apparatus 101 to be omitted. Hence, security assurance and improvement of user operability can be achieved together.

Second Processing Example

The first processing example described an example in which remote UI login authentication is executed by obtaining the remote UI access data by performing short-range wireless communication at a timing at which the information processing apparatus 101 is to display the remote UI of the communication apparatus 151. In this second processing example, an example in which the information processing apparatus 101 obtains the remote UI access data by short-range wireless communication before the timing at which it is to display the remote UI of the communication apparatus 151 will be described with reference to FIGS. 6 and 7.

First, the information processing apparatus 101 transmits (step S601) the remote UI access data obtainment request to the short-range wireless communication unit 157 of the communication apparatus 151 via the short-range wireless communication unit 110. This request is executed by GATT communication of the BLE standard. That is, the aforementioned pairing processing has been completed before the start of step S601. Here, the request may be transmitted at the activation timing of the print application or may be transmitted periodically. It may also be set so that a request will be periodically transmitted during the activation of the print application. Subsequently, the communication apparatus 151 generates, in the same manner as in the processes of steps S503 to S506 in FIG. 5, the remote UI access data, transmits the generated data to the information processing apparatus 101, and saves the generated data in the RAM 153 (steps S602 to S605).

Upon receiving the remote UI access data from the communication apparatus 151 by short-range wireless communication, the information processing apparatus 101 saves the received data in the RAM 105 (step S606). Note that at this time, the information processing apparatus 101 may execute, in the same manner as in step S507 of FIG. 5, the predetermined calculation by the predetermined calculation method on the remote UI access data and saves the obtained calculation result in the RAM 105. If the received data is to be saved intact, it can prevent the execution of unnecessary calculation on the remote UI access data which will not be used as a result. On the other hand, if the calculation result is to be saved, the subsequent login processing can be completed in a short time.

Subsequently, the communication apparatus 151 determines (step S607) whether a predetermined time has elapsed since the generation of the remote UI access data in step S603. If it is determined that a predetermined time has elapsed (YES in step S607), the communication apparatus 151 erases the saved remote UI access data from the RAM 153 (step S608).

On the other hand, assume that, in the same manner as in step S501, the information processing apparatus 101 has started (step S701) the processing to display the remote UI before a predetermined time has elapsed since the generation of the remote UI access data. In this case, in the same manner as in step S507 of FIG. 5, the information processing apparatus 101 executes the predetermined calculation in accordance with the predetermined calculation method on the remote UI access data which is saved in the RAM 105, and the obtained calculation result is saved in the RAM 105 (step S702). Note that if a result value obtained from the execution of the predetermined calculation in step S606 has been saved, step S702 need not be executed. Since the subsequent processes (steps S703 to S709) are the same as those of steps S508 to S514, a detailed description thereof will be omitted. Note that the remote UI access data used for the calculation in step S705 is the data saved in step S605.

As described above, in this second processing example, regardless of whether the information processing apparatus 101 is to display the remote UI of the communication apparatus 151, the predetermined data for remote UI access is transmitted from the communication apparatus 151 to the information processing apparatus 101 by using short-range wireless communication. Then, after starting the processing to display the remote UI, the information processing apparatus 101 transmits, to the communication apparatus 151, information indicating the calculation result value based on the received predetermined data by using the second communication function different from the first communication function related to the short-range wireless communication. As a result, even if the information processing apparatus 101 has moved to a position that does not allow short-range communication to be performed with the communication apparatus 151, the information processing apparatus can perform remote control of the communication apparatus 151 in a security ensured state without requiring an operation such as a password input by the user.

Note that the above-described embodiment has described an arrangement in which whether to display a remote UI screen (a screen which is to be displayed in a remote-control permitted state) or an error screen is switched in accordance with the success or failure of a login operation by using short-range wireless communication. However, the present invention is not limited to this. That is, the information processing apparatus 101 need not remotely control the communication apparatus 151. It may be set so that, at this time, the communication apparatus 151 will perform control to switch the screen, which is to be displayed on the information processing apparatus 101, in accordance with a determination result as to whether the second information (calculation result) received from the information processing apparatus 101 corresponds to the first information transmitted using the short-range wireless communication. That is, it can be arranged so that the communication apparatus 151 provides information related to the first screen to the information processing apparatus 101 when the first information and the second information correspond to each other, and provides information related to the second screen to the information processing apparatus 101 when the first information and the second information do not correspond. The information related to the second screen at this time corresponds to the error display in the above-described embodiment. However, for example, the information related to the second screen may be information to cause the information processing apparatus 101 to display a guide to the user so that login will be performed in accordance with a conventional manual password input method. The information related to the first screen may be information to cause the information processing apparatus to display a message which indicates that login by the conventional manual method is unnecessary. Note that "the remote UI access data" and the corresponding "calculation result" are terms used for the sake of descriptive convenience here, and these pieces of information can be expressed more generally as remote control information (first information) and information (second information) received from an information processing apparatus. The same applies to other terms used in this embodiment, and different terms can be used in accordance with the application and the role of a component within the scope of the present invention.

Note that in the above-described embodiment, the information processing apparatus 101 notifies the communication apparatus 151 of the result of predetermined calculation performed on the remote UI access data, and the communication apparatus 151 compares the result calculated in the self-apparatus with the value received from the information processing apparatus 101. However, the communication apparatus 151 may use another method by which it is possible to determine whether it has received, from the information processing apparatus 101, a piece of access information that corresponds to the same remote UI access data as that provided by the self-apparatus. For example, the information processing apparatus 101 can encrypt the remote UI access data by a predetermined encryption method and transmit the encrypted data to the communication apparatus 151, and the communication apparatus 151 decrypt the data and compare the decrypted data with the data held in the self-apparatus.

In addition, the above-described embodiment has described an example in which a remote UI access data obtainment request and the data corresponding to this request are exchanged by a short-range wireless communication method, and the calculation result values of the data are exchanged by a wireless communication method that has a relatively wide communicable range. However, the present invention is not limited to this, and these pieces of information may be exchanged by one wireless communication method. Furthermore, in a case in which two wireless communication methods are to be used, the communicable distance of these communication methods may be the same, and the short-range wireless communication method and the wireless communication method that has a relatively wide communicable range need not be necessarily used.

According to the present invention, it is possible to achieve both security assurance for each user and improvement in user operability at the time of remote control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126523, filed Jun. 28, 2017, which is hereby incorporated by reference herein in its entirety.

What is claimed is:

1. A communication apparatus comprising:
a first wireless communication unit configured to perform first wireless communication;
a second wireless communication unit configured to perform second wireless communication using a communication scheme different from the first wireless communication;
a transmission unit configured to transmit via the first wireless communication, remote control information to be used by another apparatus for displaying a state of the communication apparatus; and
a control unit configured to perform control to transmit, based on an event that information which is received from the other apparatus via the second wireless communication corresponds to the remote control information transmitted via the first wireless communication, information related to a screen including the state of the communication apparatus to the other apparatus via the second wireless communication,
wherein the control unit performs control to transmit, based on an event that the information which is received from the other apparatus via the second wireless communication does not correspond to the remote control information transmitted via the first wireless communication, information related to a login screen for the remote control, and wherein the first wireless communication unit, the second wireless communication unit, the transmission unit, and the control unit are implemented by at least one processor.

2. The apparatus according to claim 1, wherein the other apparatus transmits, for displaying the state of the communication apparatus, a calculation value obtained by executing a predetermined calculation on the remote control information to the communication apparatus, and the control unit determines, in accordance with whether the calculation value received from the other apparatus via the second wireless communication indicates a value of a result obtained by executing a predetermined calculation on the remote control information transmitted to the other apparatus via the first wireless communication, whether the information which is received from the other apparatus via the second wireless communication corresponds to the remote control information.

3. The apparatus according to claim 1, wherein the control unit randomly generates the remote control information when a request for displaying the status of the communication apparatus is received from the other apparatus via the first wireless communication.

4. The apparatus according to claim 1, wherein the control unit discards the remote control information in response to determining whether the information received from the other apparatus via the second wireless communication corresponds to the remote control information.

5. The apparatus according to claim 1, wherein the control unit discards the remote control information in response to an elapse of a predetermined time after the generation of the remote control information.

6. The apparatus according to claim 1, wherein the first wireless communication complies with a Bluetooth Low Energy (BLE) standard.

7. The apparatus according to claim 1, wherein the second wireless communication complies with IEEE802.11 standard series.

8. The apparatus according to claim 1, wherein the other apparatus displays the status of the communication apparatus based on the information related to the screen including the status of the communication apparatus on a Web browser.

9. The apparatus according to claim 1, wherein the login screen for the remote control includes an item through which a password is input.

10. The apparatus according to claim 1, wherein information of a remaining ink amount is displayed on the other apparatus as the state of the communication apparatus.

11. A control method of a communication apparatus that can perform first wireless communication and second wireless communication using a communication scheme different from the first wireless communication, the method comprising:

transmitting, via the first wireless communication, remote control information to be used by another apparatus for displaying a state of the communication apparatus;

transmitting, based on an event that information which is received from the other apparatus via the second wireless communication corresponds to the remote control information transmitted via the first wireless communication, information related to a screen including the state of the communication apparatus to the other apparatus via the second wireless communication; and transmitting, based on an event that the information which is received from the other apparatus via the second wireless communication does not correspond to the remote control information transmitted via the first wireless communication, information related to a login screen for the remote control.

12. The method according to claim 11, wherein the other apparatus transmits, for displaying the state of the communication apparatus, a calculation value obtained by executing a predetermined calculation on the remote control information to the communication apparatus, and in accordance with whether the calculation value received from the other apparatus via the second wireless communication indicates a value of a result obtained by executing a predetermined calculation on the remote control information transmitted to the other apparatus via the first wireless communication, whether the information which is received from the other apparatus via the second wireless communication corresponds to the remote control information is determined.

13. The method according to claim 11, further comprising:

randomly generating the remote control information when a request for displaying the status of the communication apparatus is received from the other apparatus via the first wireless communication.

14. The method according to claim 11, wherein the remote control information is discarded in response to determining whether the information received from the other apparatus via the second wireless communication corresponds to the remote control information.

15. The method according to claim 11, wherein the remote control information is discarded in response to an elapse of a predetermined time after the generation of the remote control information.

16. The method according to claim 11, wherein the first wireless communication complies with a Bluetooth Low Energy (BLE) standard.

17. The method according to claim 11, wherein the second wireless communication complies with IEEE802.11 standard series.

18. The method according to claim 11, wherein the other apparatus displays the status of the communication apparatus based on the information including the status of the communication apparatus on a Web browser.

19. The method according to claim 11, wherein the login screen for the remote control includes an item through which a password is input.

20. The method according to claim 11, wherein information of a remaining ink amount is displayed on the other apparatus as the state of the communication apparatus.

21. A non-transitory computer readable storage medium storing a computer program for causing a computer, included in a communication apparatus that can perform first wireless communication and second wireless communication using a communication scheme different from the first wireless communication, to perform control for transmitting, via the first wireless communication, remote control information to be used by another apparatus for displaying a state of the communication apparatus;

transmitting, based on an event that information which is received from the other apparatus via the second wireless communication corresponds to the remote control information transmitted via the first wireless communication, information related to a screen including the state of the communication apparatus to the other apparatus via the second wireless communication; and transmitting, based on an event that the information which is received from the other apparatus via the second wireless communication does not correspond to the remote control information transmitted via the first wireless communication, information related to a login screen for the remote control.

\* \* \* \* \*